(12) United States Patent
Sato et al.

(10) Patent No.: US 7,527,572 B2
(45) Date of Patent: May 5, 2009

(54) CHAIN TENSIONER

(75) Inventors: Seiji Sato, Shizuoka (JP); Tomoyoshi Izutsu, Shizuoka (JP); Satoshi Kitano, Shizuoka (JP); Hisashi Hayakawa, Shizuoka (JP)

(73) Assignee: NTN Corporation, Osaka (JP)

( * ) Notice: Subject to any disclaimer, the term of this patent is extended or adjusted under 35 U.S.C. 154(b) by 652 days.

(21) Appl. No.: 10/927,281

(22) Filed: Aug. 27, 2004

(65) Prior Publication Data
US 2005/0049093 A1 Mar. 3, 2005

(30) Foreign Application Priority Data
Aug. 29, 2003 (JP) .............................. 2003-306752
Sep. 25, 2003 (JP) .............................. 2003-333874

(51) Int. Cl.
*F16H 7/08* (2006.01)
*A41F 1/00* (2006.01)
*E05C 3/02* (2006.01)

(52) U.S. Cl. .................... 474/109; 474/101; 24/616; 292/194; 292/230; 292/304

(58) Field of Classification Search ................ 474/101, 474/109; 292/281, 261, 194, 230, 195, 198, 292/203, 210, 285, 304, 341.17; 24/616
See application file for complete search history.

(56) References Cited

U.S. PATENT DOCUMENTS

| | | | | |
|---|---|---|---|---|
| 4,331,356 A | * | 5/1982 | Noel ........................... | 292/281 |
| 5,030,169 A | * | 7/1991 | Kiso et al. ................... | 474/110 |
| 5,700,214 A | * | 12/1997 | Kuznets et al. ............... | 474/110 |
| 5,931,754 A | * | 8/1999 | Stief et al. ................... | 474/109 |
| 5,967,920 A | * | 10/1999 | Dembosky et al. .......... | 474/109 |
| 6,425,538 B1 | * | 7/2002 | Heren ......................... | 239/526 |
| 6,702,206 B2 | * | 3/2004 | Wu ............................. | 239/526 |
| 6,916,264 B2 | * | 7/2005 | Hashimoto et al. .......... | 474/109 |
| 6,928,766 B1 | * | 8/2005 | Goebel et al. ................ | 43/27.4 |
| 7,063,634 B2 | * | 6/2006 | Hashimoto et al. .......... | 474/110 |
| 2003/0017893 A1 | * | 1/2003 | Kaido et al. ................. | 474/101 |
| 2004/0092348 A1 | * | 5/2004 | Hashimoto et al. .......... | 474/109 |
| 2004/0138018 A1 | * | 7/2004 | Hayakawa et al. .......... | 474/122 |
| 2004/0266571 A1 | * | 12/2004 | Izutsu et al. ................. | 474/110 |
| 2005/0170922 A1 | * | 8/2005 | Hellmich ..................... | 474/110 |

FOREIGN PATENT DOCUMENTS

JP 58-38189 8/1983

* cited by examiner

*Primary Examiner*—Robert A Siconolfi
*Assistant Examiner*—Thomas W Irvin
(74) *Attorney, Agent, or Firm*—Wenderoth, Lind & Ponack, L.L.P.

(57) ABSTRACT

A chain tensioner includes a housing having a cylinder chamber. A plunger is slidably mounted in the cylinder chamber. A spring is mounted in the cylinder chamber to bias the plunger outwardly of the cylinder chamber. The plunger has a radially extending locking pin at its lower portion near its front end. The housing is formed with a pin hole extending substantially perpendicular to an axis of the cylinder chamber near the front end of the housing and under the cylinder chamber. The chain tensioner further includes a support pin inserted in the pin hole, and a locking lever supported on the support pin so as to be pivotable about the support pin. The locking lever can engage the locking pin when the plunger is sufficiently pushed into the cylinder chamber, thereby keeping the plunger pushed in the cylinder chamber.

6 Claims, 6 Drawing Sheets

CHAIN TENSIONER

BACKGROUND OF THE INVENTION

This invention relates to a chain tensioner for keeping a constant tension in a chain of a chain transmission device, particularly one for driving camshafts.

One conventional chain tensioner of this type includes a plunger inserted in a cylinder chamber formed in a housing, and a spring for biasing the plunger outwardly of the cylinder chamber. A pressure chamber is defined between the bottom of the housing and the inner end of the plunger. The pressure chamber is filled with hydraulic oil supplied through an oil supply passage formed in the housing to damp the pushing force applied to the plunger.

To assemble such a chain tensioner, the spring is inserted into the cylinder chamber, and the plunger is pushed into the cylinder chamber while compressing the spring. Then, with the plunger kept pushed in the cylinder chamber against the force of the spring, the housing is secured to a stationary member. Since the plunger has to be kept pushed in the cylinder chamber against the force of the spring while assembling the chain tensioner, assembly is troublesome and time-consuming.

In order to solve this problem, an improved chain tensioner was proposed. This tensioner has a pin hole formed in the outer periphery of the plunger near its protruding end and a corresponding pin hole formed through the housing near the open end of the cylinder chamber. In assembling this chain tensioner, with the plunger pushed into the cylinder chamber while compressing the spring until the pin holes align with each other, a pin is inserted into the pin holes to keep the plunger pushed in the housing without the need to continuously apply pushing force to the plunger.

While this chain tensioner can be assembled more easily than the first mentioned chain tensioner, assembly is still not sufficiently easy because the pin has to be pulled out after the chain tensioner has been assembled.

The chain tensioner disclosed in JP utility model publication 58-38189 is free of this problem because the plunger is released under the tension of the chain when the plunger is pushed by the chain.

This chain tensioner has a pin extending from the outer surface of the housing to the inner wall of the cylinder chamber and a pivot plate provided at the front end of the plunger so as to engage the pin. Thus, the pin has to be pressed into the housing so as not to easily fall off the housing.

If the housing is formed of a soft material such as an aluminum alloy, the housing tends to be deformed when the pin is pressed into the hole formed in the housing. Deformation of the housing can cause changes in the dimension of the inner wall of the cylinder chamber and/or strains in the inner wall of the cylinder chamber, which can result in a reduced clearance between the cylinder chamber and the outer periphery of the plunger and thus less smooth sliding of the plunger. This makes it difficult to operate the chain tensioner with high accuracy.

An object of the invention is to provide a chain tensioner having a plunger retaining means which can be automatically released under the tension of a chain and which will not inhibit smooth sliding of the plunger even if the housing is made of a soft material such as an aluminum alloy.

SUMMARY OF THE INVENTION

According to this invention, there is provided a chain tensioner comprising a housing having a cylinder chamber, a plunger slidably mounted in the cylinder chamber and defining a pressure chamber in the cylinder chamber in the back thereof, a spring mounted in the cylinder chamber and biasing the plunger outwardly of the cylinder chamber, the housing being provided with an oil supply passage communicating with the cylinder chamber, the pressure chamber being filled with hydraulic oil which has been supplied through the oil supply passage to damp a force applied to the plunger against the force of the spring, the plunger having a radially extending locking pin at its lower portion near its front end, the housing being formed with a pin hole extending in a transverse direction with respect to an axis of the cylinder chamber near the front end of the housing and under the cylinder chamber, the chain tensioner further comprising a support pin inserted in the pin hole, and a locking lever supported on the support pin so as to be pivotable about the support pin, the locking lever being capable of engaging the locking pin when the plunger is sufficiently pushed into the cylinder chamber, thereby keeping the plunger pushed in the cylinder chamber.

With this arrangement, even if the housing is formed of a soft material such as an aluminum alloy, the housing will never be deformed when the support pin is pressed into the pin hole to such an extent as to cause changes in the dimensions of the inner wall of the cylinder chamber and/or strains in the inner wall of the cylinder chamber. Thus, the clearance between the cylinder chamber and the plunger is kept constant. This ensures smooth sliding of the plunger and thus accurate operation of the chain tensioner.

In order to prevent the support pin from coming out of the pin hole, the support pin may be pressed into the pin hole or may have at least one end thereof caulked after the support pin has been inserted into the pin hole. The latter method is preferable because the housing is more reliably prevented from being deformed by caulking its end.

The locking lever is pivoted about the support pin to engage the locking pin, thereby keeping the plunger pushed into the cylinder chamber. When the chain is driven in this state, the plunger is pushed in by the chain. When the plunger is pushed in, the locking pin separates from the locking lever, so that the locking lever pivots by gravity back to its original position. Thus, the plunger is automatically released merely by driving the chain without the need to carry out special steps for releasing the plunger. The chain tensioner can thus be assembled easily.

Further, since the locking lever can engage the locking pin at its root portion, i.e. its portion near the outer periphery of the plunger, the locking pin is scarcely deformed when engaged by the locking lever. Thus, the plunger will scarcely move while it is being retained by the locking lever.

Preferably, the locking lever comprises a pair of parallel side edges each having a front end and a rear end, and pivotally supported at the rear ends thereof on the support pin, and a bar extending between and coupling the front ends of the side members so as to be substantially perpendicular to the side members.

Such a locking lever is sufficiently rigid, so that it can more reliably keep the plunger pushed into the cylinder chamber when it is in engagement with the locking pin.

Preferably, the side members of the locking lever are each formed with an elongated hole elongated in a longitudinal direction of the side members, and the support pin is received in the elongated holes.

After the plunger has been released, the locking lever is freely pivotable about the support pin. Thus, due to vibrations of the vehicle and/or the engine, the locking lever may pivot to its horizontal position. If the plunger is pushed in when the locking lever has pivoted to the horizontal position, the locking lever may get caught by the pin. But by receiving the support pin in the elongated holes formed in the side members, the locking lever can move backward together with the plunger when the chain is tensioned. Thus, the chain is prevented from being subjected to excessive tension.

From another aspect of the invention, there is provided a chain tensioner comprising a housing having a cylinder chamber, a plunger slidably mounted in the cylinder chamber and defining a pressure chamber in the cylinder chamber in the back thereof, a spring mounted in the cylinder chamber and biasing the plunger outwardly of the cylinder chamber, the housing being provided with an oil supply passage communicating with the cylinder chamber, the pressure chamber being filled with hydraulic oil which has been supplied through the oil supply passage to damp a force applied to the plunger against the force of the spring, the housing having on its outer surface a shoulder portion near its front end, the shoulder portion being formed with a pin hole extending substantially parallel to an axis of the cylinder chamber, the housing being further formed with a through hole extending from the outer surface of the housing to the inner wall of the cylinder chamber, the chain tensioner further including a pin comprising a long arm having first and second ends, and a short arm extending from the first end of the long arm and having a free end, the long arm and the short arm forming a predetermined angle with respect to each other, wherein the long arm has the second end inserted in the pin hole and the short arm being received in the through hole, the pin hole, the through hole and the pin being structured such that while the pin is subjected to no external stress, the free end of the short arm is disposed in the through hole, and the pin can be elastically deformed until the free end protrudes into the cylinder chamber, thereby engaging a front end face of the plunger when the plunger is pushed into the cylinder chamber while compressing the spring.

With this arrangement, too, even if the housing is formed of a soft material such as an aluminum alloy, the housing will never be deformed when the pin is pressed into the pin hole to such an extent as to cause changes in the dimensions of the inner wall of the cylinder chamber and/or strains in the inner wall of the cylinder chamber. Thus, it is possible to maintain a constant clearance between the cylinder chamber and the plunger. This ensures smooth sliding of the plunger and thus accurate operation of the chain tensioner.

As soon as the plunger is pushed in by the chain, and the free end of the short arm separates from the plunger, the short arm retracts into the through hole. Thus, the plunger can be released automatically by pushing the plunger with the chain. The chain tensioner can thus be assembled easily.

Preferably, the chain tensioner of the present invention further comprises a backward movement restricting arrangement for preventing the plunger from moving toward an end wall of the cylinder chamber over a predetermined distance.

The backward movement restricting arrangement may comprise a clip-receiving groove formed in the inner wall of the cylinder chamber near an opening thereof, a plurality of circumferential grooves formed in a radially outer surface of the plunger, the circumferential grooves being spaced at equal intervals from each other in the axial direction of the cylinder chamber, and a register clip received in the clip-receiving groove and one of the circumferential grooves, the circumferential grooves each comprising a rear taper of which the diameter increases gradually toward the rear end thereof such that the clip can move toward the end wall of the cylinder chamber across the taper while expanding in a radial direction thereof, and a front jaw structured such that the clip cannot move toward the opening of the cylinder chamber across the jaw.

Alternatively, the backward movement restricting arrangement may comprise a screw rod inserted in a rod-inserting hole formed in the plunger from its rear opening, the screw rod having on its radially outer surface a male thread that is in threaded engagement with a female thread formed on the inner wall of the rod-inserting hole, the male and female threads each having a pressure flank for bearing an axial force applied to the plunger against the force of the spring, and a clearance flank, the pressure flank having a greater flank angle than the clearance flank such that the threads have a serration-shaped longitudinal section, the threads having such a lead angle that when the axial force applied to the plunger against the force of the spring disappears, the plunger can turn and move axially outwardly under the force of the spring.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
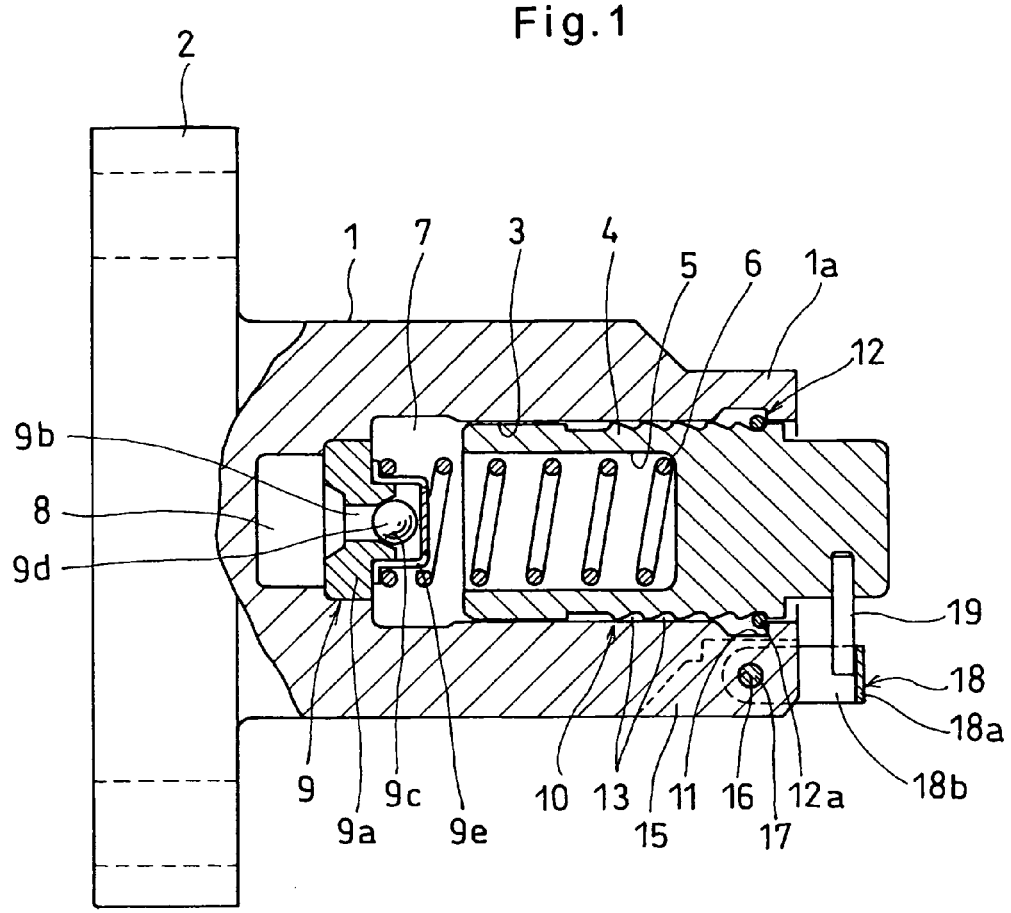
FIG. 1 is a partially cutaway front view of a chain tensioner of a first embodiment of the present invention.

Referring first to FIGS. 1-4, the chain tensioner of the first embodiment includes a cylindrical housing 1 formed of a soft material such as an aluminum alloy and having a small-diameter portion 1a at a front end thereof and an integral mounting flange 2 at a rear end.

The housing 1 has a cylinder chamber 3 having an opening at the front end thereof. A plunger 4 is slidably mounted in the cylinder chamber 3.

The plunger 4 has a spring mounting chamber 5 having an opening at its rear end. A spring 6 is mounted in the spring mounting chamber 5 to bias the plunger 4 outwardly of the housing 1.

A pressure chamber 7 is defined in the cylinder chamber 3 by the plunger 4. The pressure chamber 7 and the spring mounting chamber 5, which communicates with the pressure chamber 7, are filled with hydraulic oil which is supplied through an oil supply passage 8 formed in the end wall of the cylinder chamber 3. A check valve 9 is provided in the oil supply passage 8 at its end connecting to the pressure chamber 7 to prevent the hydraulic oil in the pressure chamber 7 from flowing back into the oil supply passage 8. The check valve 9 comprises a seating member 9a mounted on the end wall of the cylinder chamber 3 and having a valve hole 9b formed with a valve seat 9c at its end facing the pressure chamber 7, and a check ball 9d retained by a retainer 9e so as to be selectively moved into and out of contact with the valve seat 9c. When the check ball 9d is in contact with the valve seat 9c, the valve hole 9b is closed. The retainer 9e restricts the movement of the check ball 9d and thus the degree of opening of the check valve 9.

Between the housing 1 and the plunger 4, the chain tensioner includes an arrangement 10 for restricting the backward movement of the plunger 4, i.e. its movement toward the end wall of the cylinder chamber 3, to a predetermined distance.

Figure 4:
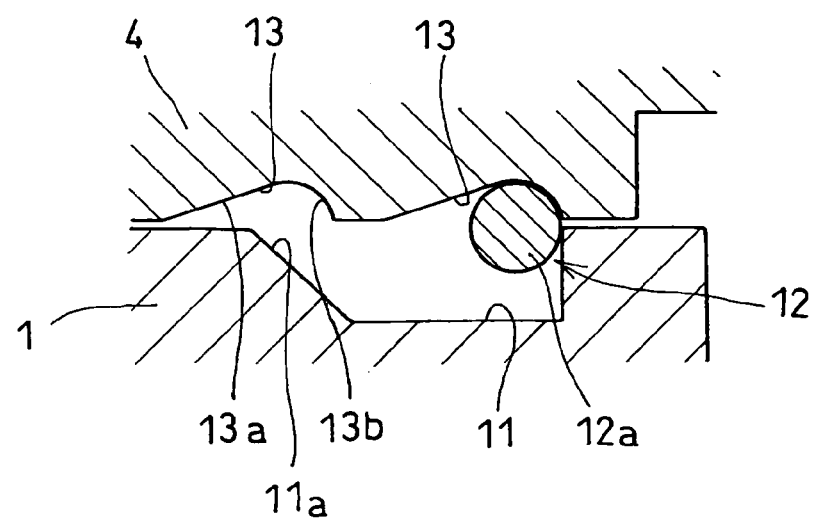
FIG. 4 is a partial enlarged sectional view of a backward movement restricting arrangement of FIG. 1.

As shown in FIG. 4, the backward movement restricting arrangement 10 comprises a clip receiving groove 11 formed in the inner wall of the cylinder 1 near its opening, a plurality of circumferential grooves 13 formed in the outer periphery of the plunger 4 at equal intervals in the axial direction of the plunger, and a register clip 12 having a radially deformable ring portion 12a received in the groove 11 and adapted to be received in one of the circumferential grooves 13 while tightly pressed against the bottom of the groove 13. Each circumferential groove 13 comprises a taper 13a of which the diameter gradually decreases toward the front end of the plunger 4 and a jaw 13b extending from the small-diameter end of the taper 13a toward the front end of the plunger.

Figure 3:
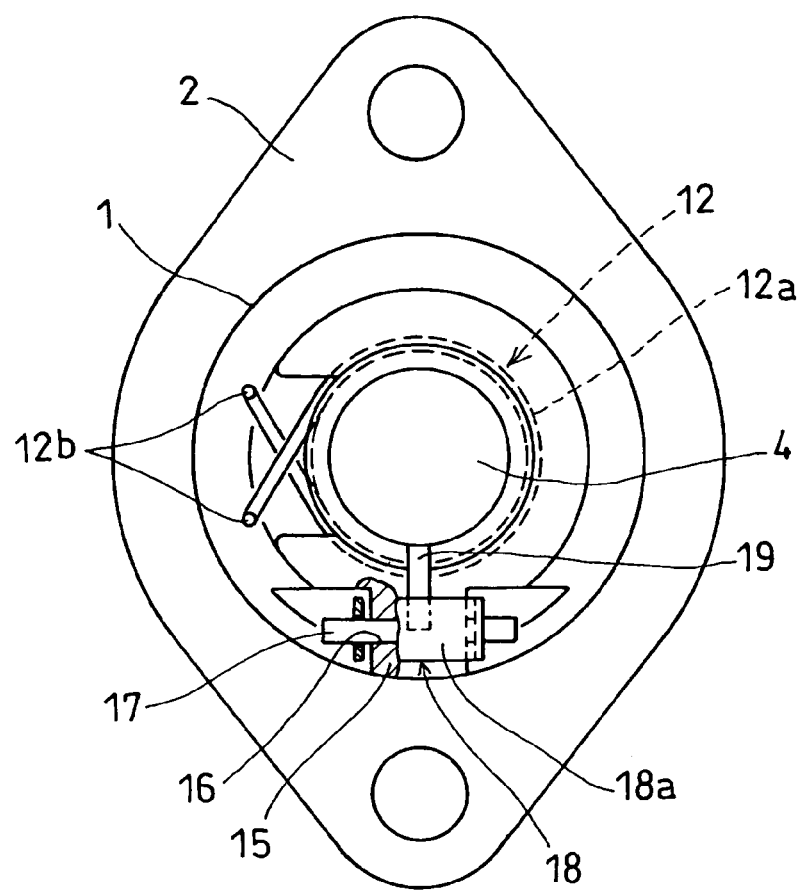
FIG. 3 is a partially cutaway right-hand side view of FIG. 1.

As shown in FIG. 3, the register clip 12 has grips 12b extending from the respective ends of the ring portion 12a. The grips 12b have their ends protruding from a cutout 14 formed in the small-diameter portion 1a of the housing 1. By pressing the ends of the grips 12b from both sides, the ring portion 12 will radially expand.

When the plunger 4 advances, i.e. moves rightwardly in FIG. 4, with the ring portion 12a of the clip 12 received in one of the circumferential grooves 13, the ring portion 12a can slide axially on the taper 13a while radially expanding, and move into the rear circumferential groove 13. Thus the backward movement restricting arrangement 10 does not restrict the advancement of the plunger 4. However, when the plunger 4 moves backward, i.e. leftwardly in FIG. 4, the ring portion 12a will get stuck between the jaw 13b of the circumferential groove 13 and a rear tapered surface 11a of the clip receiving groove 11, thereby preventing any further backward movement of the plunger 4.

Figure 2:
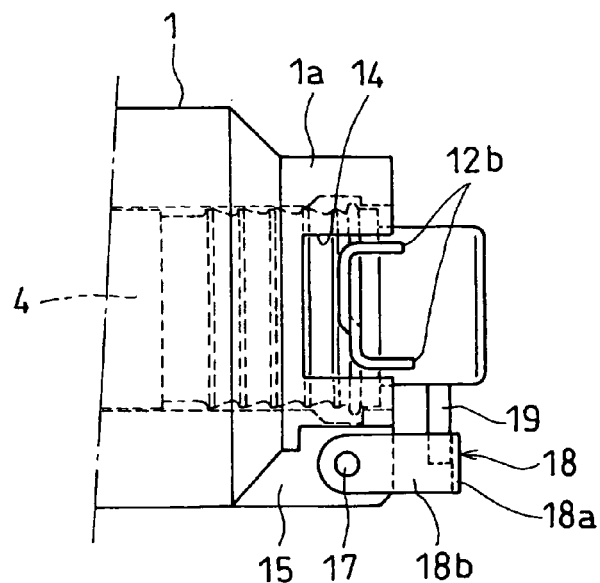
FIG. 2 is a partial front view of FIG. 1.

As shown in FIGS. 1 and 2, the small-diameter portion 1a of the housing 1 has at its lower portion an axial protrusion 15 formed with a pin hole 16 in which is pressed a support pin 17. A locking lever 18 is supported on the support pin 17 so as to be pivotable about the pin 17. Specifically, the locking lever 18 comprises side members 18b having their rear ends pivotally supported on the pin 17, and a bar 18a extending between the front ends of the side members 18b so that the locking lever 18 is U-shaped. The plunger 4 carries a downwardly extending locking pin 19 near its front end. With the plunger 4 sufficiently pushed into the cylinder chamber 3, the locking lever 18 is pivoted until the side members 18b are substantially horizontal, and the plunger 4 is released. When the plunger 4 is released, it advances until the pin 19 engages the bar 18a of the locking lever 18 as shown in FIGS. 1 and 2.

Once the pin 19 engages the bar 18a, the plunger 4 cannot advance any further. Thus, the plunger 4 is kept pushed in the cylinder chamber 3.

Figure 5:
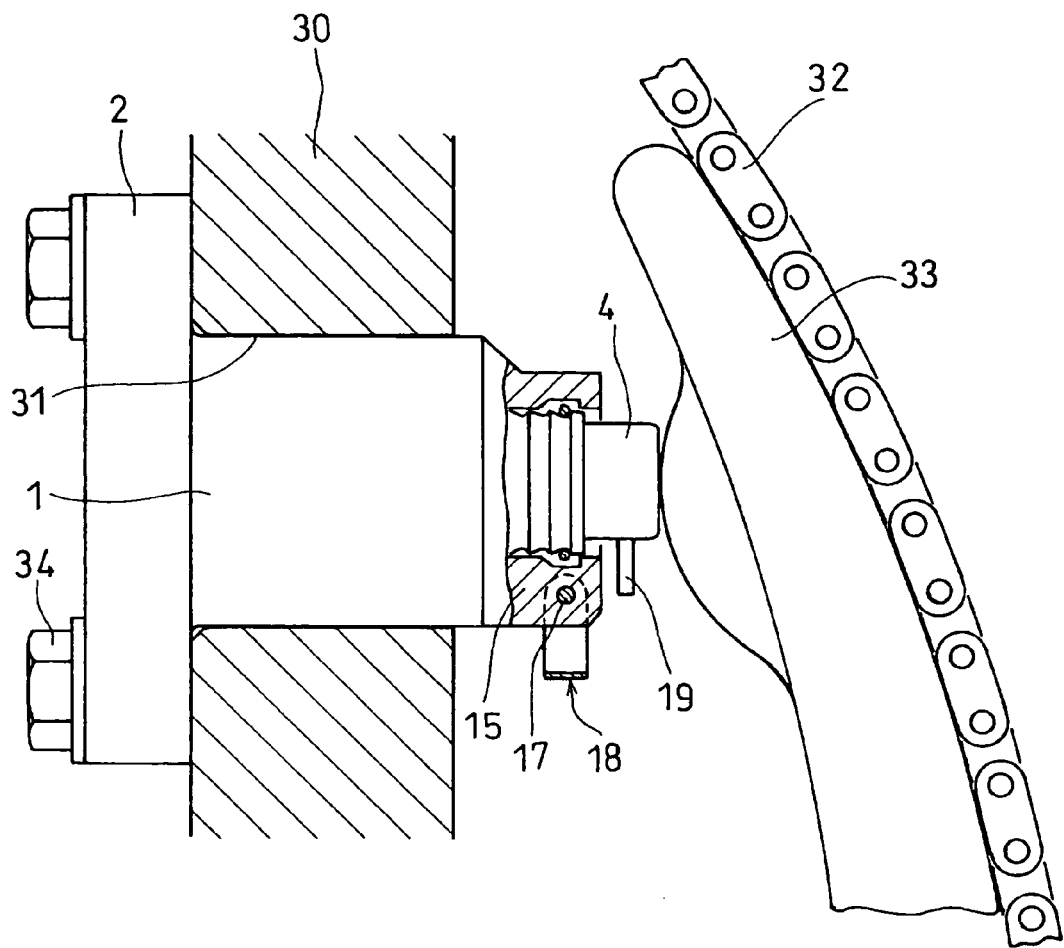
FIG. 5 is a partially cutaway front view of the chain tensioner of FIG. 1, showing how it is used.

With the pin 19 engaging the bar 18a, the chain tensioner is mounted on an engine cover 30 protecting a chain 32 for driving camshafts as shown in FIG. 5. Specifically, the housing 1 of the chain tensioner is inserted into a mounting hole 31 formed in the engine cover 30 until the flange 2 is pressed against the engine cover 30. In this state, the flange 2 is secured to the engine cover 30 by tightening bolts 34, and the chain 32 is temporarily driven. When the chain 32 is driven, the plunger 4 is pushed into the cylinder chamber 3 by the chain 32 through a chain guide 33. When the plunger 4 is pushed into the cylinder chamber, the pin 19 separates from the bar 18a of the locking lever 18. The locking lever 18 thus pivots clockwise in FIG. 5 by gravity into the position of FIG. 5. The plunger 4 is now freely movable according to the fluctuating tension in the chain 32. That is, the plunger moves to a position where the force applied from the chain 32 balances with the force of the spring 6, thereby keeping a constant tension in the chain 32.

As described above, simply by temporarily driving the chain 32 with the chain tensioner mounted on the engine cover 30, the locking lever 18 spontaneously disengages from the pin 19 and thus from the plunger 4 without the need to carry out separate steps for freeing the plunger 4. The chain tensioner can thus be assembled easily.

After the chain tensioner has been assembled and mounted on the engine cover, hydraulic oil is supplied into the pressure chamber 7 through the oil supply passage 8 until the pressure chamber 7 (as well as the chamber 5) is filled with hydraulic oil. The hydraulic oil serves to damp the pushing force applied to the plunger 4 from the chain 32.

While the pushing force is greater than the force of the spring 6, the plunger 4 is allowed to move backward until the ring portion 12a of the register clip 12 gets stuck between the rear tapered surface 11a of the clip receiving groove 11 and the jaw 13b of the circumferential groove 13 in which is received the ring portion 12a, but not any further.

When the engine is stopped, according to the positions of the cams when the engine stopped, the chain 32 may be under high tension. But because the backward movement of the plunger 4 is restricted, the chain tension is kept at a high level while the engine is at a stop. Thus, when the engine is restarted and the chain 32 is driven, the chain will not slack so markedly. This prevents flapping of the chain 32 and jumping of gear teeth at the start of the engine.

When the chain 32 slacks while being driven, the plunger 4 quickly advances, i.e. moves outwardly under the force of the spring 6, thereby pressing the chain 32 through the chain guide 33. The chain 32 is thus re-tensioned quickly.

The plunger 4 can advance smoothly because the ring portion 12a of the register clip 12 can move past the taper 13a of any of the circumferential grooves 13 to the adjacent next groove 13 while radially expanding.

The chain 32 tends to be stretched with time. When the chain 32 is stretched, it is necessary to advance the plunger 4 to maintain uniform tension in the chain. With the arrangement of the present invention, the plunger 4 can be smoothly advanced because the ring portion 12a can move from one circumferential groove 13 into the next groove 13.

The pin hole 16 and thus the pin 17 are provided at the front end of the housing 1 and thus are sufficiently apart from the cylinder chamber 3. They extend in a direction substantially perpendicular to the axis of the cylinder chamber 3. Thus, even if the housing 1 is formed of a soft material such as an aluminum alloy, it is less likely to be deformed when the pin 17 is pressed into the pin hole 16 to such an extent as to cause change in the dimension of the inner surface of the cylinder chamber 3 or strains in the inner surface of the cylinder chamber 3.

Thus, the plunger 4 can always slide smoothly, so that the chain tensioner operates with high accuracy.

Figure 6:
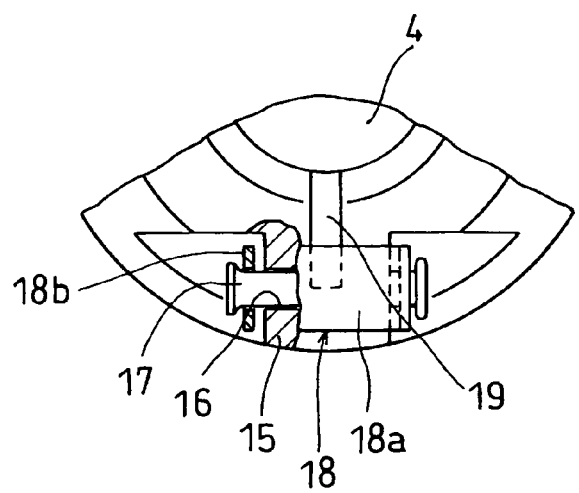
FIG. 6 is a partially cutaway side view of a chain tensioner according to a second embodiment of the present invention.

Now referring to FIG. 6, the second embodiment differs from the first embodiment only in that the pin 17 has a head at one end thereof. The pin 17 is inserted into the pin hole 16 formed in the protrusion 15 and the side members 18b of the locking lever 18 with the other end, i.e. the end not formed with the head, first. Then, the other end is caulked so that the pin 17 will not disengage from the pin hole 16 and the side members 18b. Otherwise, this embodiment is identical to the first embodiment. Thus, like elements are denoted by like numerals and their description is omitted.

Figure 7:
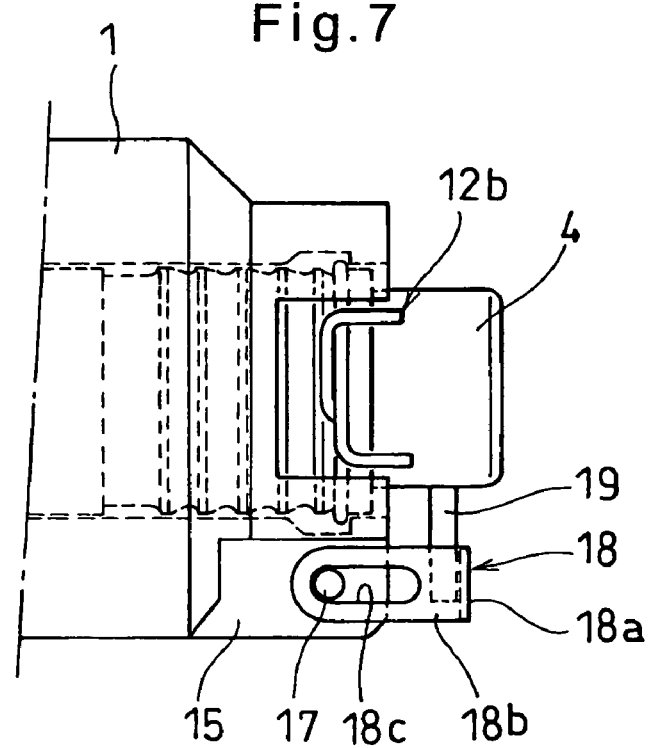
FIG. 7 is a front view in vertical section of a chain tensioner according to a third embodiment of the present invention.
Figure 8:
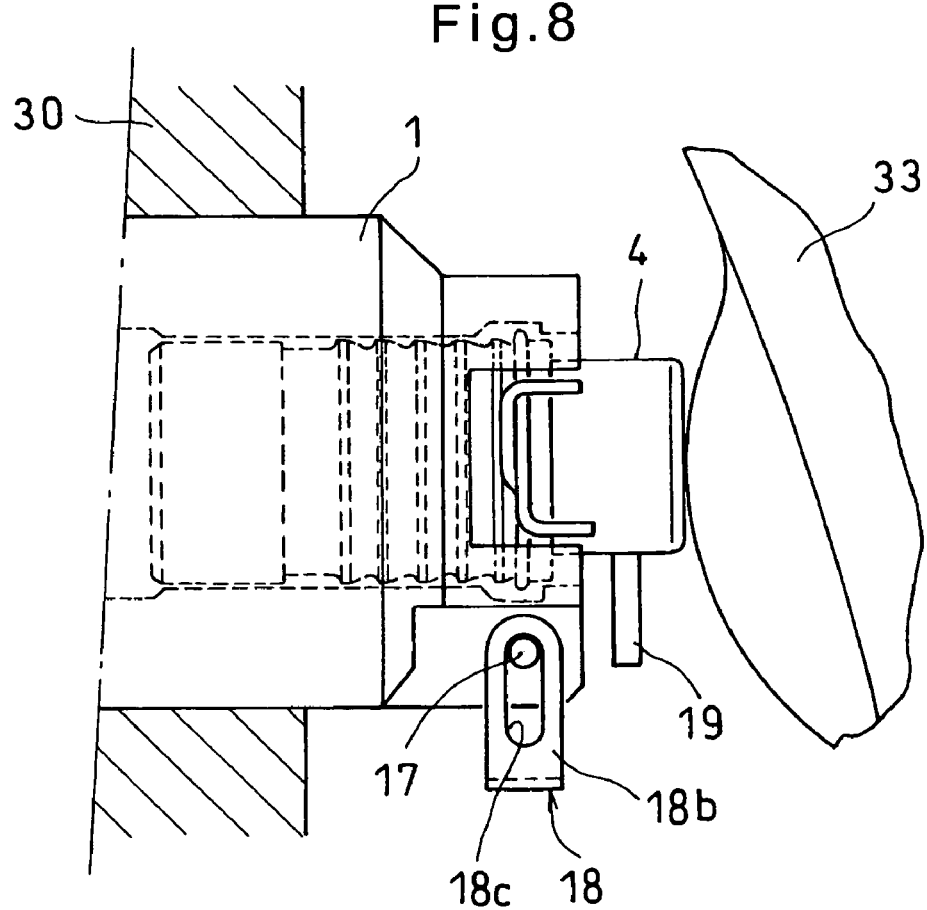
FIG. 8 is a sectional view of the chain tensioner of FIG. 7, showing how it is used.
Figure 9:
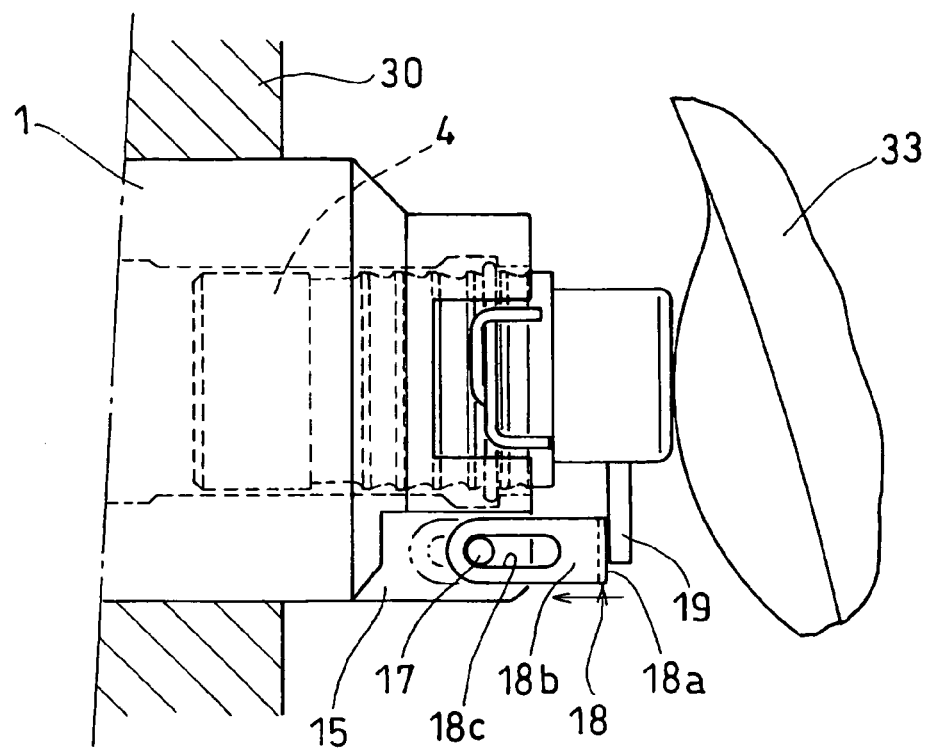
FIG. 9 is a sectional view of the chain tensioner of FIG. 7, showing how the bar of the locking lever gets caught behind the locking pin.

The third embodiment shown in FIGS. 7-9 differs from the first embodiment only in that the side members 18b of the locking lever 18 are each formed with an elongated hole 18c elongated in the length direction of the side member 18b, and the pin 17 is received in these elongated holes 18c.

Otherwise, this embodiment is identical to the first embodiment. Thus, like elements are denoted by like numerals and their description is omitted.

Before mounting the chain tensioner on the engine cover 30, the plunger 4 is pressed into the cylinder chamber 3 and locked in this position by engaging the locking lever 18 with the pin 19 as shown in FIG. 7. When the chain tensioner is mounted on the engine cover, and the chain is driven for the first time, the plunger is pushed into the cylinder chamber, and the locking lever 18 separates from the pin 19 as shown in FIG. 8. The tension in the chain 32 is now adjusted by the chain tensioner.

In this state, the locking lever 18 is freely pivotable about the pin 17. Thus, due to vibrations of the vehicle and/or the engine, the locking lever 18 may pivot wildly to its horizontal position. If the plunger 4 is pushed in when the locking lever 18 has pivoted to the horizontal position, the locking lever 18 may get caught by the pin 19 as shown in FIG. 9.

The same thing can happen in the first embodiment, too. That is, the locking lever 18 of the first embodiment may get caught by the pin 19. If the locking lever 18 of the first embodiment gets caught as shown in FIG. 8, the lever 18 cannot move backward because the pin 17 is received in circular holes formed in the side members 18b of the locking lever. This means that the pin 19 as well as the plunger 4 itself cannot move backward. Thus, the tension in the chain may increase excessively.

In contrast, the locking lever 18 of the third embodiment can move backward in the state of FIG. 9 because the pin 17 is received not in circular holes but in the elongated holes 18c. Thus, the plunger 4 can also move backward in the state of FIG. 9. This prevents the chain 32 from being subjected to excessive tension.

Figure 10:
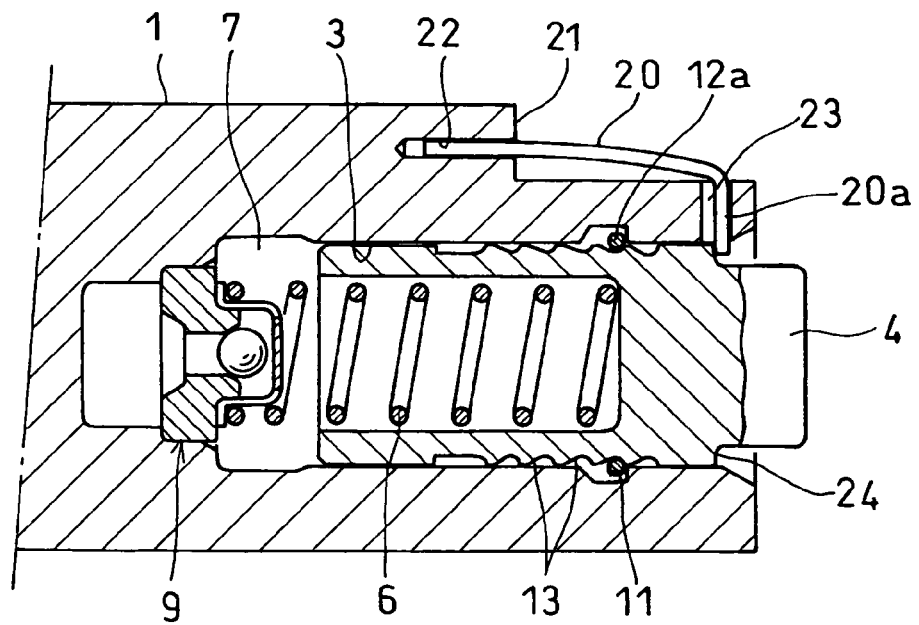
FIG. 10 is a front view in vertical section of a chain tensioner according to a fourth embodiment of the present invention.
Figure 11:
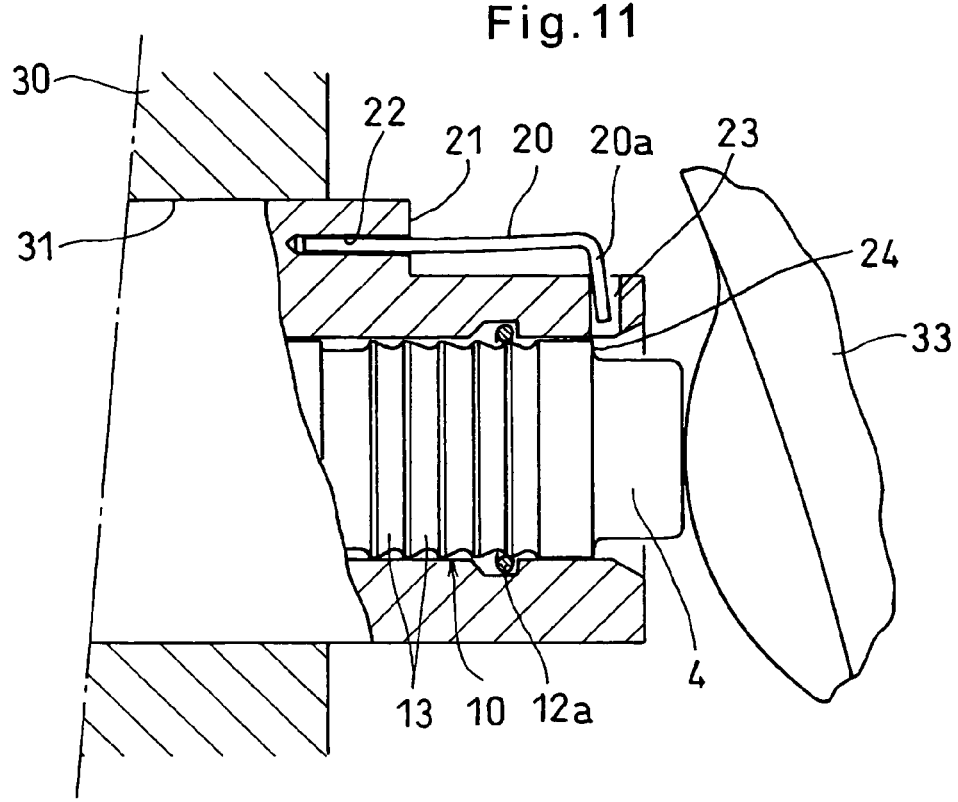
FIG. 11 is a sectional view of the chain tensioner of FIG. 10, showing how it is used.

The fourth embodiment, shown in FIGS. 10 and 11, differs from the first embodiment in that an L-shaped pin 20 is used to keep the plunger 4 pushed into the cylinder chamber 3.

Specifically, the upper front end of the housing 1 is cut out to define a shoulder 21. A pin hole 22 is formed in the shoulder 21 so as to extend parallel to the axis of the cylinder chamber 3. A through hole 23 is formed in the cylinder 1 in the bottom of the cutout so as to extend to the inner wall defining the cylinder chamber 3. The L-shaped pin 20 has the end of its longer arm inserted in the pin hole 22 and the shorter arm 20a inserted in the through hole 23.

Otherwise, the fourth embodiment is identical to the first embodiment. Thus, like elements are denoted by like numerals and their description is omitted.

FIG. 11 shows the state of the pin 20 when it is subjected to no external force or stress. Before mounting the chain tensioner to the engine cover 30 shown in FIG. 5, the plunger 4 is pushed into the cylinder chamber 3, the shorter arm 20a of the pin 20 is pressed downwardly until its free end protrudes into the cylinder chamber 3, and the plunger 4 is released. When the plunger 4 is released, its front end engages the free end of the shorter arm 20a of the pin 20 as shown in FIG. 10. Thus, the plunger 4 is kept in this position by the pin 20. When the chain tensioner is mounted on the engine cover 30, and the chain 32 is driven, the plunger is moved backward, so that the pin 20 separates from the plunger 4 and returns to the position of FIG. 11.

Thus, in this embodiment too, the plunger 4 spontaneously disengages from the locking means or the pin 20 simply by driving the chain without the need to carry out special steps for disengaging the plunger.

Since the pin 20 is inserted in the pin hole 22, which extends parallel to the axis of the cylinder chamber 3, even if the housing 1 is formed of a soft material such as an aluminum alloy, the housing 1 is less likely to be deformed to such an extent as to cause changes in the dimension of the inner wall defining the cylinder chamber 3 and/or strains in the inner wall defining the cylinder chamber 3.

The plunger 4 can thus slide smoothly and the chain tensioner operates with high accuracy.

Figure 12:
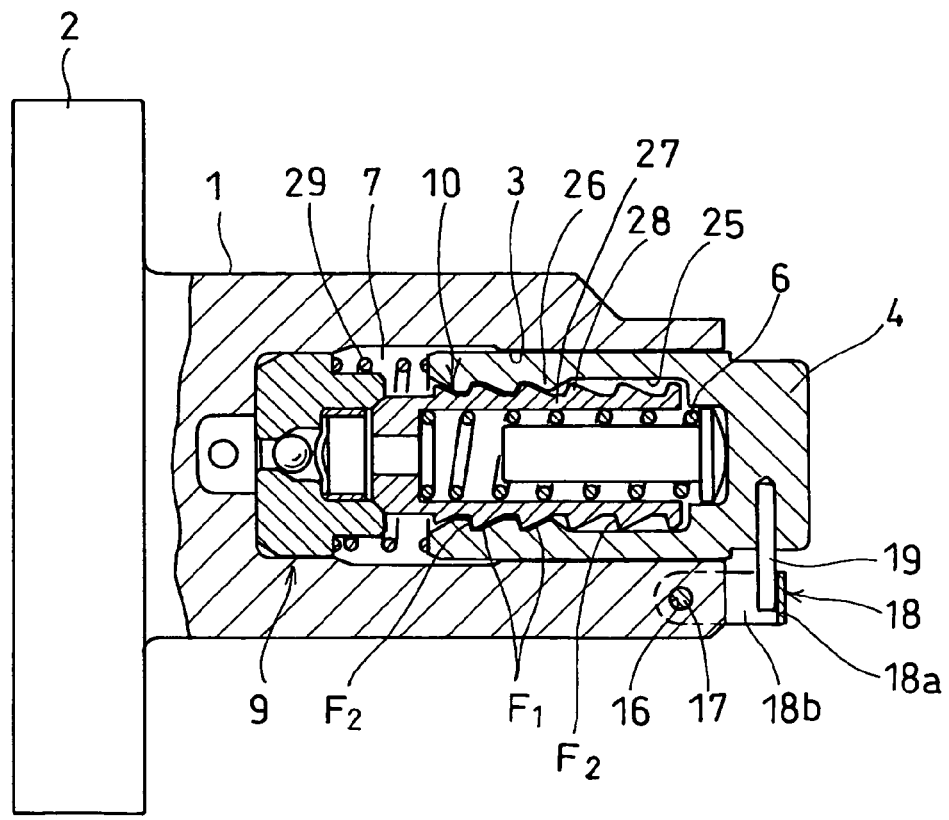
FIG. 12 is a partially cutaway front view of a chain tensioner according to a fifth embodiment of the present invention.

The fifth embodiment, shown in FIG. 12, uses a different backward movement restricting arrangement 10 from the one used in the first embodiment.

Otherwise, the fifth embodiment is identical to the first embodiment. Thus, like elements are denoted by like numerals and their description is omitted.

The backward movement restricting arrangement 10 of the fifth embodiment includes a screw rod 27 inserted in a hole 25 formed in the plunger 4 and having an opening at the rear end thereof. The screw rod 27 is formed with a screw thread 28 on its outer surface which is in threaded engagement with a screw thread 26 formed in the inner wall of the hole 25. Each of the screw threads 26 and 28 has a pressure flank F1 which bears the force applied to the plunger 4, and a clearance flank F2. The pressure flank F1 has a greater flank angle than the clearance flank F2, so that the threads 26, 28 have a serration-like longitudinal section as clearly shown in FIG. 12. A spring 6 is mounted between the plunger 4 and the screw rod 27 to bias them away from each other. The threads 26 and 28 have such a lead angle that when the pushing force applied to the plunger disappears, the plunger can move toward and away from the screw rod 27 while turning relative to the screw rod 27 under the force of the spring 6.

In this embodiment, an additional spring 29 is mounted between the plunger 4 and the check valve 9 to bias the plunger 4 outwardly.

The chain tensioner of this embodiment is mounted to the chain cover 30 shown in FIG. 5 in exactly the same manner as the chain tensioner of the first embodiment. With the chain tensioner mounted on the engine cover and the plunger disengaged, when the chain 32 slacks, the plunger 4 moves axially toward the chain under the force of the springs 6 and 29.

When the engine is stopped, according to the positions of the cams when the engine has stopped, the chain 32 may be under high tension and the plunger may be subjected to a large load. But because the load acting on the plunger while the engine is at a stop is a static load, the plunger cannot turn and thus cannot move backward under such static load.

Because the plunger cannot move backward, the chain tension is kept at a high level while the engine is at a stop. Thus, when the engine is restarted and the chain 32 is driven, the chain will not slack so markedly. This prevents flapping of the chain 32 and jumping of gear teeth at the start of the engine.

What is claimed is:

1. A chain tensioner comprising:
   a housing having a cylinder chamber;
   a plunger slidably mounted in said cylinder chamber and defining a pressure chamber in said cylinder chamber in the back thereof;
   a spring mounted in said cylinder chamber and biasing said plunger outwardly of said cylinder chamber;
   wherein said housing is provided with an oil supply passage communicating with said cylinder chamber for supplying hydraulic oil into said pressure chamber to damp a force applied to said plunger against the force of said spring;
   wherein said plunger has a radially extending locking pin at its lower portion near its front end;
   wherein said housing includes a protrusion disposed below said cylinder chamber near the front end thereof and having first and second opposite sides disposed opposite each other in a transverse direction with respect to an axis of said cylinder chamber;
   wherein a pin hole extends through said protrusion in said transverse direction with respect to the axis of said cylinder chamber from said first side to said second side of said protrusion;
   wherein a support pin is inserted in said pin hole so as to extend through said protrusion below said cylinder chamber in said transverse direction with respect to the axis of said cylinder chamber, and a locking lever is supported on said support pin so as to be pivotable about said support pin, said locking lever being capable of engaging said locking pin when said plunger is sufficiently pushed into said cylinder chamber, thereby keeping said plunger pushed in said cylinder chamber;
   wherein said locking lever comprises a pair of parallel side members each having a front end and a rear end, and pivotally supported at the rear ends thereof on said support pin, and a bar extending between and coupling the front ends of said side members so as to be substantially perpendicular to said side members; and
   wherein said side members of said locking lever are disposed on said first and second opposite sides, respectively, of said protrusion.

2. The chain tensioner of claim 1, further comprising a backward movement restricting arrangement for preventing said plunger from moving toward an end wall of said cylinder chamber over a predetermined distance.

3. The chain tensioner of claim 1, wherein said side members of said locking lever are each formed with an elongated hole that is elongated in a longitudinal direction of said side members, and said support pin is received in said elongated holes, and wherein said locking lever comprises a U-shaped member.

4. The chain tensioner of claim 3, wherein said longitudinal direction of said side members of said locking lever is a direction extending from said support pin toward said bar of said locking lever.

5. The chain tensioner of claim 1, wherein said housing has a reduced-diameter portion at the front end thereof, and said protrusion protrudes radially downwardly from said reduced-diameter portion.

6. The chain tensioner of claim 1, wherein said housing has a main portion and, at the front end thereof, a reduced-diameter portion reduced in diameter relative to said main portion, and wherein said protrusion protrudes axially forwardly from said main portion and radially downwardly from said reduced-diameter portion.

* * * * *